US012751427B2

(12) United States Patent
Nakamura

(10) Patent No.: US 12,751,427 B2
(45) Date of Patent: Oct. 6, 2026

(54) INFORMATION PROCESSING DEVICE, INFORMATION PROCESSING METHOD, AND PROGRAM

(71) Applicant: Murata Manufacturing Co., Ltd., Kyoto (JP)

(72) Inventor: Kenji Nakamura, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 19/177,775

(22) Filed: Apr. 14, 2025

(65) Prior Publication Data

US 2026/0150813 A1 Jun. 4, 2026

Related U.S. Application Data

(63) Continuation of application No. PCT/JP2023/037437, filed on Oct. 16, 2023.

(30) Foreign Application Priority Data

Oct. 17, 2022 (JP) ................................ 2022-166123

(51) Int. Cl.
*A01K 29/00* (2006.01)
*A01K 27/00* (2006.01)

(52) U.S. Cl.
CPC ............ *A01K 29/007* (2025.08); *A01K 27/00* (2013.01)

(58) Field of Classification Search
CPC .............................. A01K 29/007; A01K 27/00
See application file for complete search history.

(56) References Cited

U.S. PATENT DOCUMENTS

| | | | | |
|---|---|---|---|---|
| 7,702,502 B2 * | 4/2010 | Ricci | G06F 18/00 | 600/509 |
| 8,548,740 B2 * | 10/2013 | Hesch | G01C 21/16 | 701/479 |
| 11,439,343 B1 * | 9/2022 | Tan | G08B 21/06 | |
| 2011/0066062 A1 * | 3/2011 | Banet | A61B 5/0816 | 600/534 |

(Continued)

FOREIGN PATENT DOCUMENTS

WO 2020/017273 A1 1/2020

OTHER PUBLICATIONS

International Search Report issued in Patent Application No. PCT/JP2023/037437 dated Dec. 19, 2023.

*Primary Examiner* — Hoi C Lau
(74) *Attorney, Agent, or Firm* — McDonald Hopkins LLC

(57) ABSTRACT

An information processing device classifies biological activity patterns of an animal. The information processing device includes an arithmetic circuit configured to receive a biological signal that is a detection result of a biological activity of the animal acquired by a sensor having a plurality of detection channels or a sensor unit including a plurality of sensors. The arithmetic circuit detects a quasi-periodic signal from the detection result, scales the quasi-periodic signal in a time direction, generates a scaled signal whose period has a predetermined value, decomposes the scaled signal into a plurality of frequency components, acquires pieces of chronological phase information of the multiple frequency components, and classifies the biological activity patterns based on the pieces of chronological phase information.

19 Claims, 17 Drawing Sheets

(56) References Cited

U.S. PATENT DOCUMENTS

| | | | | |
|---|---|---|---|---|
| 2019/0076054 | A1* | 3/2019 | Banet | A61B 5/318 |
| 2021/0315516 | A1* | 10/2021 | Rattehalli | G16H 20/70 |
| 2022/0359078 | A1* | 11/2022 | Singhal | A61B 5/112 |
| 2022/0409082 | A1* | 12/2022 | Howie | G01R 29/0814 |
| 2023/0000380 | A1* | 1/2023 | Howie | A61B 5/05 |
| 2023/0000381 | A1* | 1/2023 | Howie | A61B 5/7278 |
| 2023/0210384 | A1* | 7/2023 | Banet | A61B 5/0205<br>600/484 |
| 2023/0335287 | A1* | 10/2023 | Miller | G16H 50/30 |
| 2026/0081034 | A1* | 3/2026 | Miller | G16H 50/30 |
| 2026/0081035 | A1* | 3/2026 | Miller | G16H 50/30 |

* cited by examiner

INFORMATION PROCESSING DEVICE, INFORMATION PROCESSING METHOD, AND PROGRAM

CROSS-REFERENCE TO RELATED APPLICATIONS

This application is a continuation of International Patent Application No. PCT/JP2023/037437 filed on Oct. 16, 2023, which claims priority from Japanese Patent Application No. JP 2022-166123 filed on Oct. 17, 2022. The contents of these applications are incorporated herein by reference in their entireties.

BACKGROUND ART

Technical Field

The present disclosure relates to an information processing device, an information processing method, and a program.

A technique is known for analyzing a periodic waveform or a quasi-periodic signal having quasi-periodic characteristics. Quasi-periodic means, for example, that the period of a signal waveform is not exactly constant but has variations. For example, Patent Document 1 discloses the method of decomposing the waveform of a quasi-periodic signal obtained from an electrocardiogram into a plurality of frequency components by wavelet transform and storing the phase information of each of these frequency components in a storage device.

Patent Document 1: U.S. Pat. No. 7,702,502

BRIEF SUMMARY

However, the frequency of a quasi-periodic signal representing a biological activity is not constant over time. Accordingly, processing for decomposing the quasi-periodic signal into a plurality of frequency components becomes complicated. This may lead to the increase in the amount of computation of an information processing device for performing such processing.

The present disclosure provides an information processing device, an information processing method, and a program with which the load of processing for decomposing a quasi-periodic signal into a plurality of frequency components can be further reduced.

An information processing device according to an aspect of the present disclosure classifies biological activity patterns of an animal.

The information processing device includes an arithmetic circuit configured to receive a biological signal that is a detection result of a biological activity of the animal acquired by a sensor having a plurality of detection channels or a sensor unit including a plurality of sensors.

The arithmetic circuit

- detects a quasi-periodic signal from the detection result,
- scales the quasi-periodic signal in a time direction and generates a scaled signal whose period has a predetermined value,
- decomposes the scaled signal into a plurality of frequency components,
- acquires pieces of chronological phase information of the multiple frequency components, and
- classifies the biological activity patterns based on the pieces of chronological phase information.

An information processing method according to an aspect of the present disclosure classifies biological activity patterns of an animal.

The information processing method includes

- a step of causing an arithmetic circuit configured to receive a biological signal that is a detection result of a biological activity of the animal acquired by a sensor having a plurality of detection channels or a sensor unit including a plurality of sensors to detect a quasi-periodic signal from a detection result of a biological activity,
- a step of causing the arithmetic circuit to generate a scaled signal by scaling the quasi-periodic signal such that a period of the quasi-periodic signal has a predetermined value after being scaled,
- a step of causing the arithmetic circuit to decompose the scaled signal into a plurality of frequency components,
- a step of causing the arithmetic circuit to acquire pieces of chronological phase information of the multiple frequency components, and
- a step of causing the arithmetic circuit to classify the biological activity patterns based on the pieces of chronological phase information.

A program according to an aspect of the present disclosure causes an arithmetic circuit to execute the above-described information processing method.

According to an information processing device, an information processing method, and a program according to the present disclosure, the load of processing for decomposing a quasi-periodic signal into a plurality of frequency components can be further reduced.

DETAILED DESCRIPTION

Figure 1:
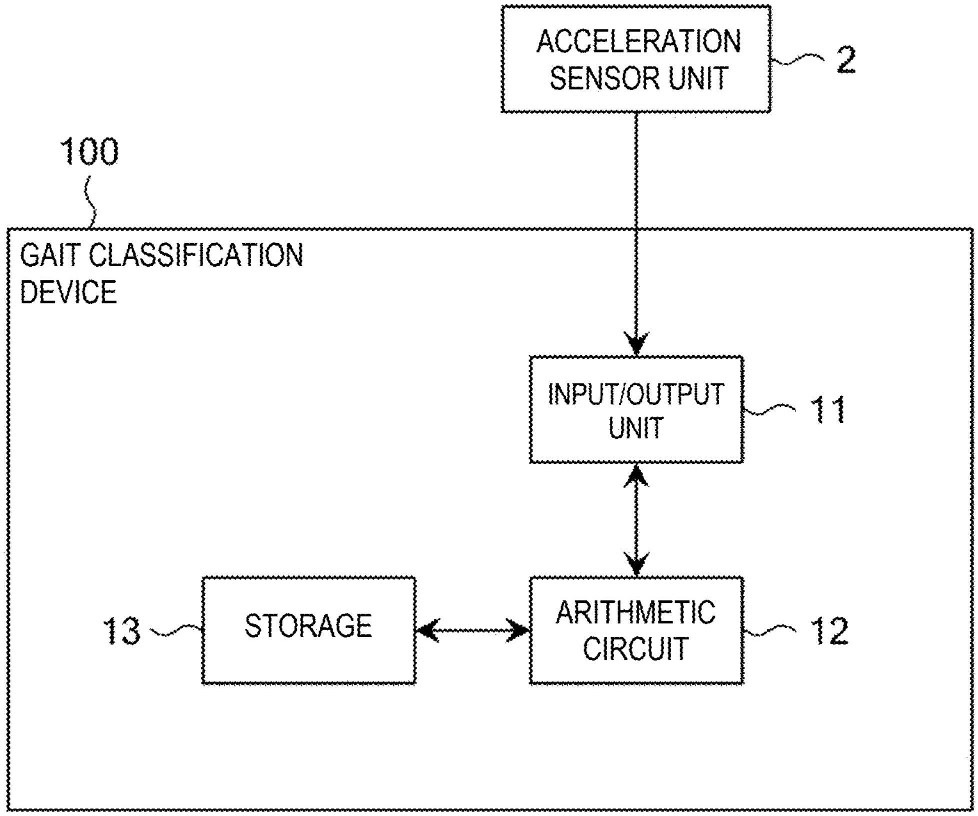
FIG. 1 is a block diagram illustrating an exemplary configuration of a gait classification device according to an embodiment of the present disclosure.

Background Leading Up to the Present Disclosure

A technique may be required for detecting biological activities of animals such as people and pets with, for example, sensors and understanding the biological activities of the animals. By understanding the biological activities of the animals, information about the animals, such as health conditions and the amount of movement, can be understood and utilized for health care.

For example, the related art (refer to Patent Document 1) discloses the method of decomposing the waveform of a quasi-periodic signal obtained from an electrocardiogram into a plurality of frequency components by wavelet transform. The wavelet transform is performed by, for example, inputting a result of biological activity detection performed by a sensor into a filter bank. The characteristics of filters for respective frequency bands included in the filter bank depend on a plurality of parameters, such as Nd, $k_p$, Ni, and $w_p$ (refer to FIGS. 1 to 5 and descriptions thereof in Patent Document 1).

The characteristics of a filter bank in the related art need to be determined in advance in accordance with the fundamental frequency of a quasi-periodic signal to be input into the filter bank. However, the frequencies of signals representing animal biological activities such as walking, heartbeat, and respiration are not constant. In order to allow the wavelet transform to be performed even if the frequency of a signal changes, a parameter with which the characteristics of a filter bank are determined need to be changed in response to the change in the frequency of the signal. Accordingly, the wavelet transform becomes complicated, and the amount of computation of an information processing device for performing such processing may increase. For example, in order to determine the characteristics of a filter bank, parameters that are the product of the number of parameters in a single frequency band and the number of frequency bands are needed.

In a walking analysis that is an example of techniques for understanding animal biological activities, an animal walking state is detected with a sensor such as an acceleration sensor. It is often suitable to detect forward/backward, left/right, and up/down movements to understand the characteristics of the walking. Accordingly, there is room for more accurate prediction of the animal walking state by detecting accelerations in a plurality of directions than by detecting only an acceleration in one axial direction.

An acceleration sensor unit including a plurality of acceleration sensors or an acceleration sensor having a plurality of channels that detects accelerations in a plurality of directions is considered. In this case, there is also room for more accurate prediction of the animal walking state not only by analyzing acceleration signals in a plurality of directions one by one but also by analyzing them in a comprehensive or integrated manner. In the related art, acceleration signals in a plurality of directions are analyzed one by one. However, as a result of studies, the inventor has conceived the technique for analyzing acceleration signals in a plurality of directions in a comprehensive manner in consideration of the mutual temporal relationship between these acceleration signals.

Patent Document 1 discloses the technique with which an abnormality in an electrocardiogram measurement result of one channel can be detected, but does not disclose the technique for classifying biological activity patterns, such as gait, heartbeat, and respiration. As a result of studies, the inventor has found that the technique for classifying biological activity patterns such as, gait, heartbeat, and respiration with biological activity detection results obtained by a plurality of sensors or a sensor having a plurality of channels is useful for the understanding of information about an animal, such as health conditions and the amount of movement, and has conceived such a classification technique.

Embodiment

An embodiment of an information processing device according to the present disclosure will be described below with reference to the accompanying drawings. In the following embodiment, the same reference numerals are given to the same or similar components. In the accompanying drawings, for example, the shapes, dimensions, positional relationship of constituent elements may be exaggerated for ease of understanding of explanations.

FIG. 1 is a block diagram illustrating an exemplary configuration of a gait classification device 100 according to an embodiment of the present disclosure. The gait classification device 100 is an example of an information processing device according to the present disclosure. The gait classification device 100 classifies the gaits of a quadruped animal, e.g., a dog. For example, the gait classification device 100 classifies whether the gait of a dog is walk, trot, or gallop or run.

The gait classification device 100 includes an input/output unit 11, an arithmetic circuit 12, a storage 13, and a communication unit 14.

The input/output unit 11 is an interface circuit that connects the gait classification device 100 and an external device such as an acceleration sensor unit 2 to receive information from the external device or output information to the external device. The input/output unit 11 may be a communication circuit for performing data communication in accordance with an existing wire or wireless communication standard.

The arithmetic circuit 12 implements the function of the gait classification device 100 by performing information processing. For example, such information processing is performed by the arithmetic circuit 12 executing a program stored in the storage 13. The arithmetic circuit 12 is formed by, for example, a circuit, such as a CPU, an MPU, or an FPGA. The arithmetic circuit 12 may be formed by such a single circuit or a plurality of circuits. Regarding the constituent elements of the arithmetic circuit 12, functions may be omitted, replaced, or added as appropriate depending on the embodiment.

The storage 13 stores various pieces of data including programs required for the implementation of functions of the gait classification device 100 and a learned model. The storage 13 is formed by, for example, a semiconductor storage device such as a flash memory or a solid state drive (SSD), a magnetic storage device such as a hard disk drive (HDD), or another recording medium alone or in combination thereof. The storage 13 may include a transitory storage device such as an SRAM or a DRAM.

The acceleration sensor unit 2 is a sensor capable of detecting a plurality of first acceleration components. The multiple first acceleration components are, for example, n acceleration components, where n is an integer greater than or equal to 2. The acceleration sensor unit 2 is, for example, a sensor capable of detecting accelerations in three axial directions (x, y, and z directions) perpendicular to each other (n=3). The acceleration sensor unit 2 is an acceleration sensor having three channels one-to-one corresponding to the three axial directions. Alternatively, the acceleration sensor unit 2 may be a unit including a first acceleration sensor for detecting an acceleration in the x direction, a second acceleration sensor for detecting an acceleration in the y direction, and a third acceleration sensor for detecting an acceleration in the z direction.

Figure 2:
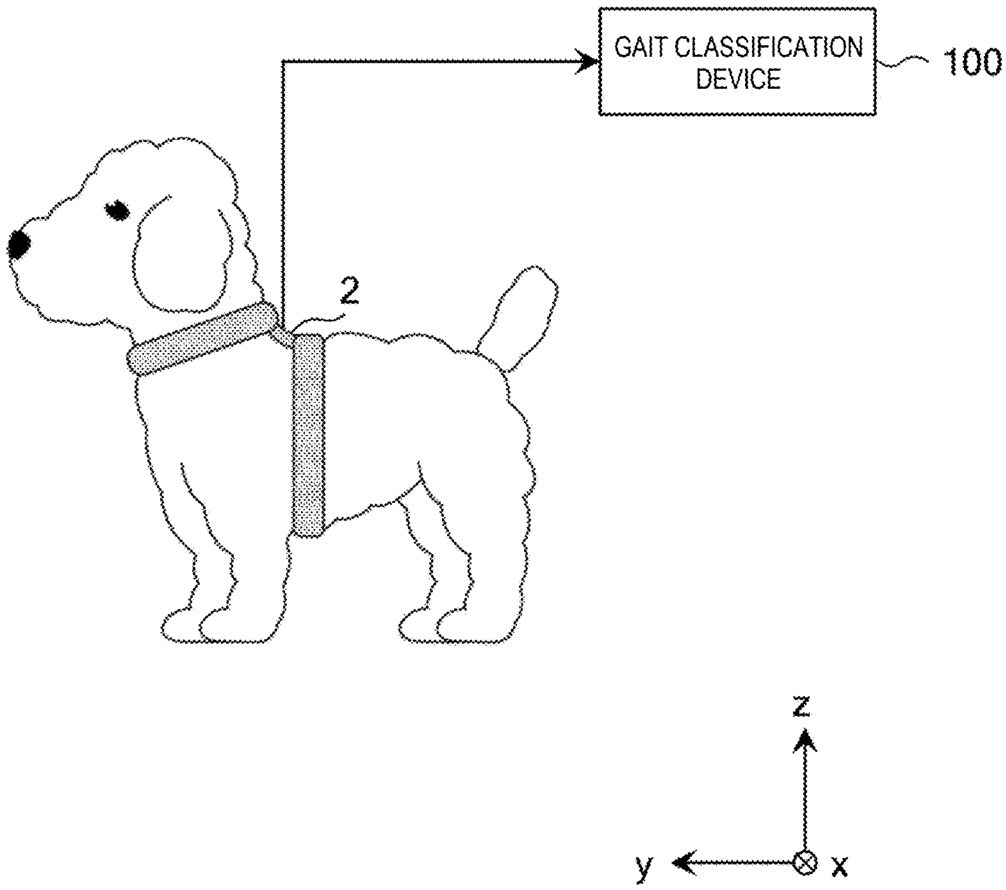
FIG. 2 is a schematic diagram exemplifying the attachment position and orientation of an acceleration sensor unit illustrated in FIG. 1.

FIG. 2 is a schematic diagram exemplifying the attachment position and orientation of the acceleration sensor unit 2 illustrated in FIG. 1. The acceleration sensor unit 2 is attached to, for example, a gear such as a collar or a harness worn by a dog. When the direction in which a dog moves forward is set as a forward direction, for example, the acceleration sensor unit 2 is attached to the gear of the dog such that accelerations in a left/right direction (the x direction), a front/back direction (the y direction), and a vertical direction (the z direction) perpendicular to each other can be detected. The positive direction of each axis is illustrated in FIG. 2.

Figure 3:
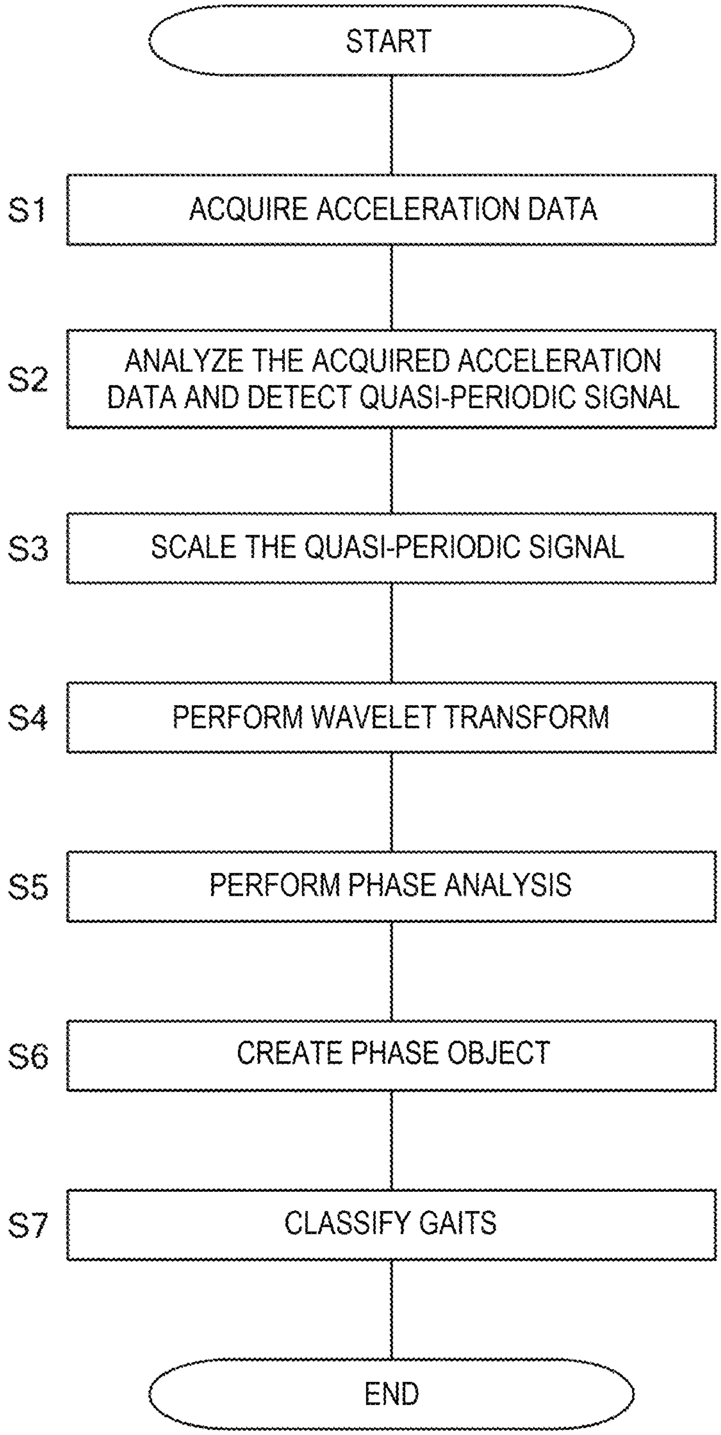
FIG. 3 is a flowchart illustrating an example of a gait classification method performed by the gait classification device illustrated in FIG. 1.

FIG. 3 is a flowchart illustrating an example of a gait classification method performed by the gait classification device 100. First, the arithmetic circuit 12 acquires respective pieces of acceleration data in the x, y, and z directions from the acceleration sensor unit 2 (S1). The arithmetic circuit 12 may acquire acceleration data from the acceleration sensor unit 2 in real time. Alternatively, the storage 13 may store acceleration data measured by the acceleration sensor unit 2, and the arithmetic circuit 12 may read the acceleration data stored in the storage 13.

Subsequently, the arithmetic circuit 12 analyzes the acceleration data acquired in step S1 and detects a quasi-periodic signal (S2). A waveform representing a biological signal generated by a biological activity such as the acceleration acquired in step S1 does not repeat at regular time intervals with exactly the same shape. In this specification, such a biological signal is called a quasi-periodic signal. When a quasi-periodic signal is not detected in step S2, the arithmetic circuit 12 ends the process illustrated in FIG. 3 or returns to step S1.

Between steps S1 and S2 or in step S2, filtering for removing noise included in the acceleration data may be performed. Such noise is generated by, for example, disturbance or animal body motion. The filtering is performed by, for example, an infinite impulse response (IIR) band pass filter. The filtering may be performed by, for example, another band pass filter such as a finite impulse response (FIR) filter.

Subsequently, the arithmetic circuit 12 acquires a scaled signal obtained by scaling the quasi-periodic signal detected in step S2 in a time direction (S3). In step S3, the arithmetic circuit 12 scales the quasi-periodic signal such that the period of the scaled signal has a predetermined value.

Figure 4:
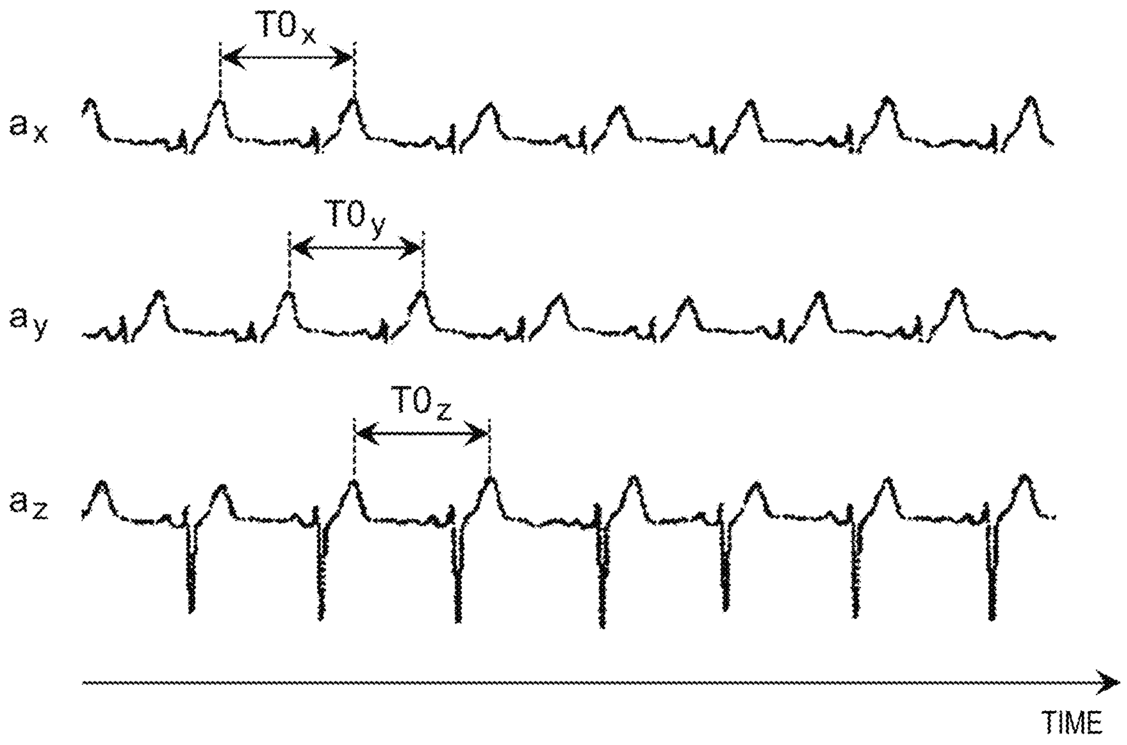
FIG. 4 is an exemplary schematic diagram illustrating a scaling processing.
Figure 5:
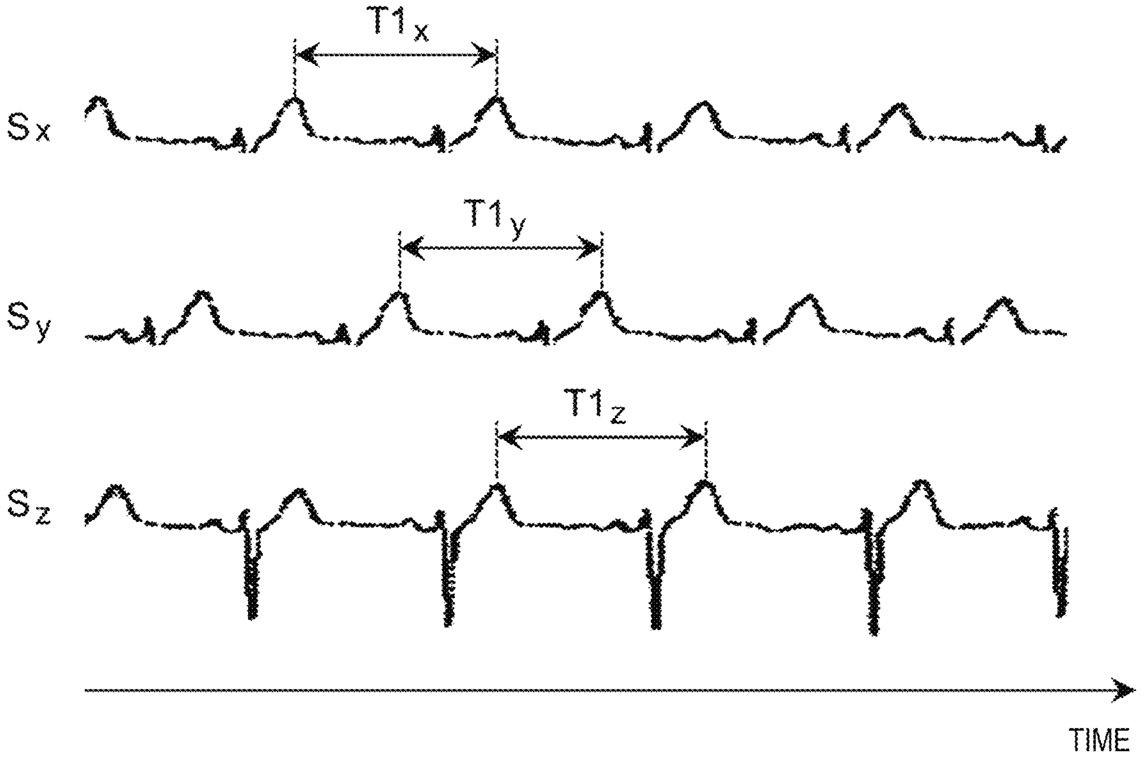
FIG. 5 is an exemplary schematic diagram illustrating the scaling processing.

FIGS. 4 and 5 are exemplary schematic diagrams illustrating the scaling processing in step S3. FIG. 4 is a graph representing the respective pieces of acceleration data ($a_x$, $a_y$, and $a_z$) in the x, y, and z directions acquired by the acceleration sensor unit 2 in step S1. FIG. 4 illustrates periods $T0_x$, $T0_y$, and $T0_z$ of the accelerations $a_x$, $a_y$, and $a_z$, respectively, which are quasi-periodic signals. For example, these periods of the quasi-periodic signals are detected by the arithmetic circuit 12 in step S2 or S3.

FIG. 5 is a graph representing the scaled signals ($S_x$, $S_y$, and $S_z$) obtained by scaling the pieces of acceleration data ($a_x$, $a_y$, and $a_z$), respectively, illustrated in FIG. 4 in step S3. The periods of the scaled signals $S_x$, $S_y$, and $S_z$ are $T1_x$, $T1_y$, and $T1_z$, respectively. $T1_x$, $T1_y$, and $T1_z$ are equal to predetermined values $T_x$, $T_y$, and $T_z$, respectively, that are set in advance. The values of $T_x$, $T_y$, and $T_z$ may be different from or equal to each other.

Thus, in step S3, the arithmetic circuit 12 scales the quasi-periodic signals such that the periods $T1_x$, $T1_y$, $T1_z$ of the scaled signals have the predetermined values $T_x$, $T_y$, and $T_z$, respectively. For example, since the period of the quasi-periodic signal $a_z$ that is an original signal in the z direction is $T0_z$, the arithmetic circuit 12 can acquire the scaled signal $S_z$ whose period is $T_z$ by resampling the original signal at $T_z/T0_z$ times a sampling rate.

Figure 6A:
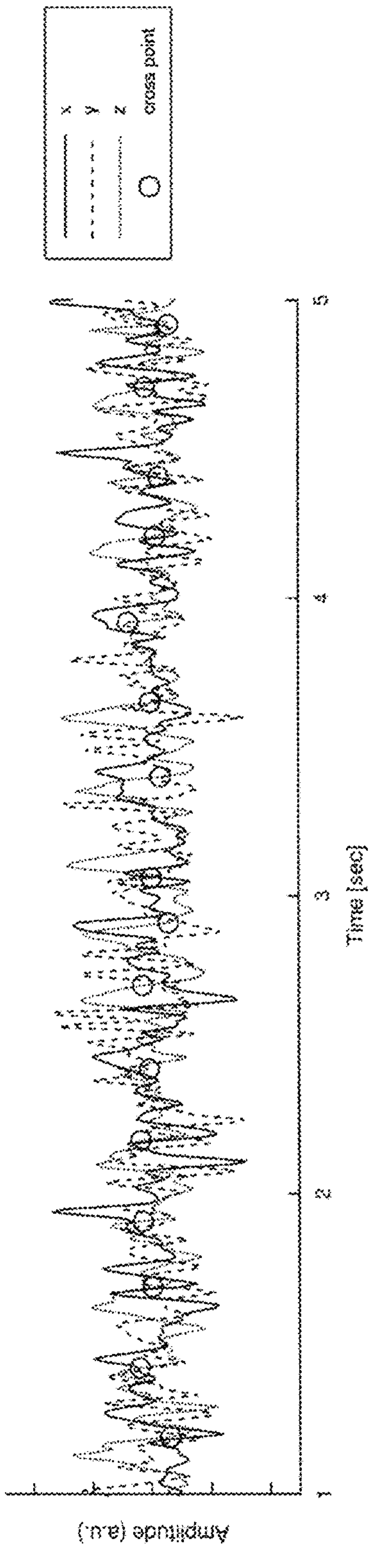
FIG. 6A is a graph illustrating an example of processing for detecting the period of a quasi-periodic signal.
Figure 6B:
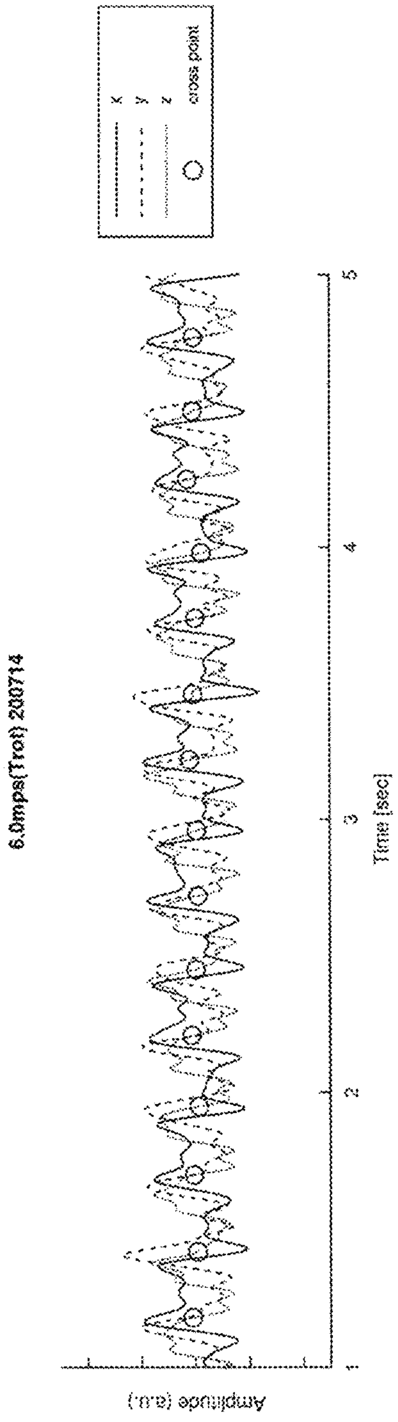
FIG. 6B is a graph illustrating an example of the processing for detecting the period of a quasi-periodic signal.

FIGS. 6A and 6B are graphs illustrating an example of processing for detecting the period of a quasi-periodic signal. FIG. 6A illustrates the waveform of acceleration data acquired by the acceleration sensor unit 2 attached to a dog that is performing walk. FIG. 6B illustrates the waveform of acceleration data acquired by the acceleration sensor unit 2 attached to a dog that is performing trot. In the graphs illustrated in FIGS. 6A and 6B, a solid line represents the x-direction acceleration $a_x$, a broken line represents the y-direction acceleration $a_y$, and a dotted line represents the z-direction acceleration $a_z$.

Circle signs illustrated in FIGS. 6A and 6B represent points at which the z-direction acceleration $a_z$ passes a dynamic threshold in a negative direction. This dynamic threshold is the midpoint between the local maximum value of the z-direction acceleration $a_z$ and the minimum value adjacent to the local maximum value. For example, the arithmetic circuit 12 determines the time between adjacent dynamic thresholds as the period of the z-direction acceleration $a_z$. The same thing can be said for the x direction and the y direction.

Figure 7A:
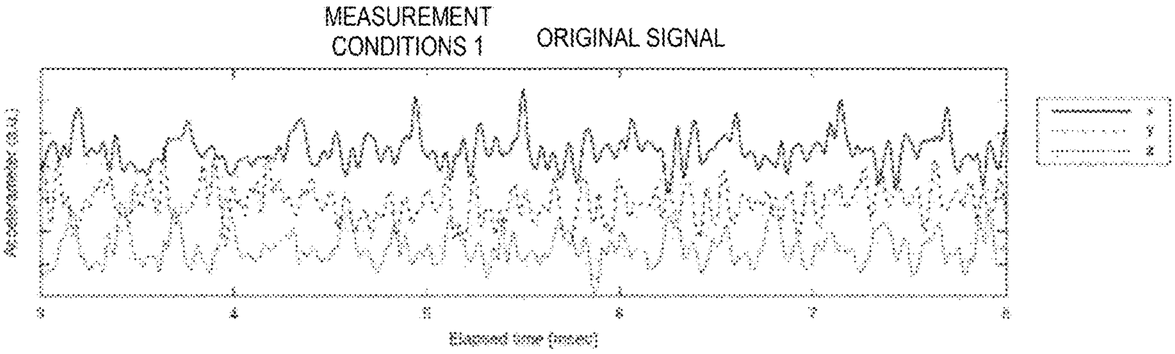
FIG. 7A is a diagram illustrating the effect of scaling a quasi-periodic signal such that the period of a scaled signal has a predetermined value.
Figure 7B:
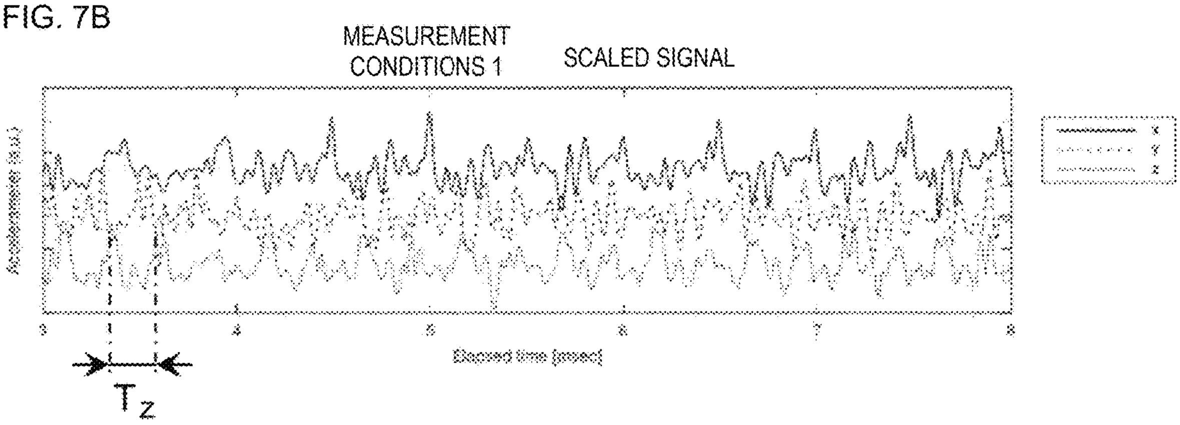
FIG. 7B is a diagram illustrating the effect of scaling a quasi-periodic signal such that the period of a scaled signal has a predetermined value.
Figure 7C:
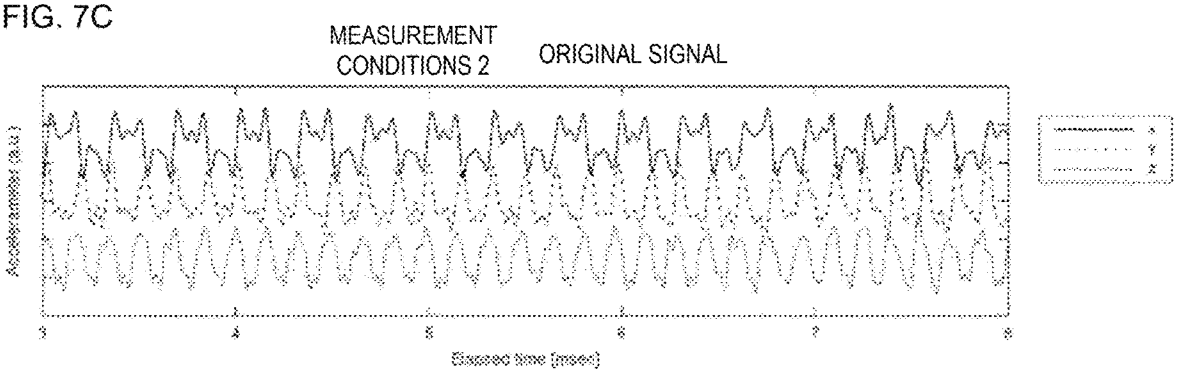
FIG. 7C is a diagram illustrating the effect of scaling a quasi-periodic signal such that the period of a scaled signal has a predetermined value.
Figure 7D:
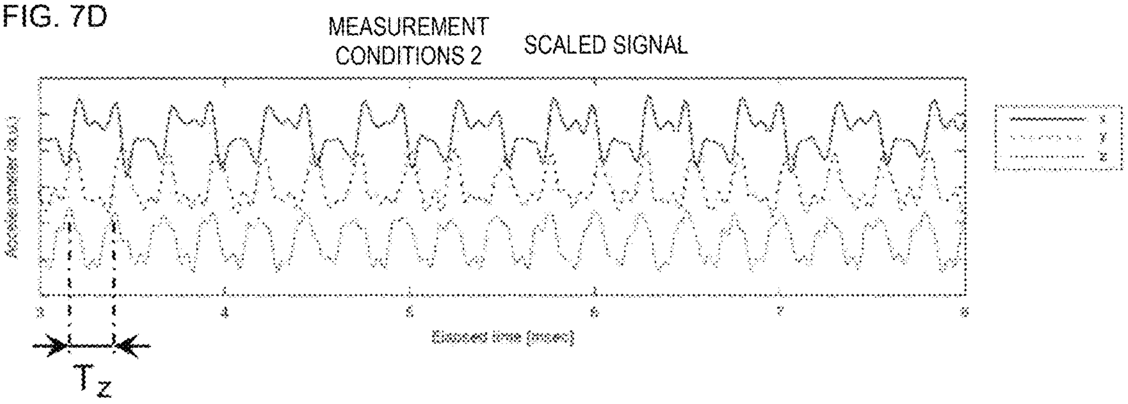
FIG. 7D is a diagram illustrating the effect of scaling a quasi-periodic signal such that the period of a scaled signal has a predetermined value.

FIGS. 7A to 7D are diagrams illustrating the effect of scaling a quasi-periodic signal (original signal) in a time direction such that the period of a scaled signal has a predetermined value. FIG. 7A is a graph representing the respective pieces of acceleration data in the x, y, and z directions acquired by the acceleration sensor unit 2 in step S1 under measurement conditions 1. FIG. 7B is a graph representing scaled signals obtained by scaling the original signals illustrated in FIG. 7A in step S3. FIG. 7C is a graph representing the respective pieces of acceleration data ($a_x$, $a_y$, and $a_z$) in the x, y, and z directions acquired by the acceleration sensor unit 2 in step S1 under measurement conditions 2. FIG. 7D is a graph representing scaled signals obtained by scaling the original signals illustrated in FIG. 7C in step S3.

The original signal in FIG. 7A obtained under the measurement conditions 1 and the original signal in FIG. 7C obtained under the measurement conditions 2 have different periods, but the periods of the scaled signals in FIGS. 7B and 7D obtained after scaling are the same. Accordingly, by performing the scaling processing upon quasi-periodic signals in step S3, the gait classification device 100 can perform a wavelet transform in step S4 or a phase analysis using the same parameter even when the quasi-periodic signals have been obtained under different conditions. Accordingly, the load of processing for decomposing a quasi-periodic signal into a plurality of frequency components can be further reduced.

Referring back to FIG. 3, after step S3, the arithmetic circuit 12 performs a wavelet transform upon the scaled signal obtained in step S3 (S4). As a result of this, the arithmetic circuit 12 decomposes the scaled signal into a plurality of ($m(m\geq2)$) frequency components. The wavelet transform is performed by, for example, inputting the scaled signal into a filter bank. The filter bank has the same configuration as, for example, the filter bank disclosed in Patent Document 1.

Figure 8:
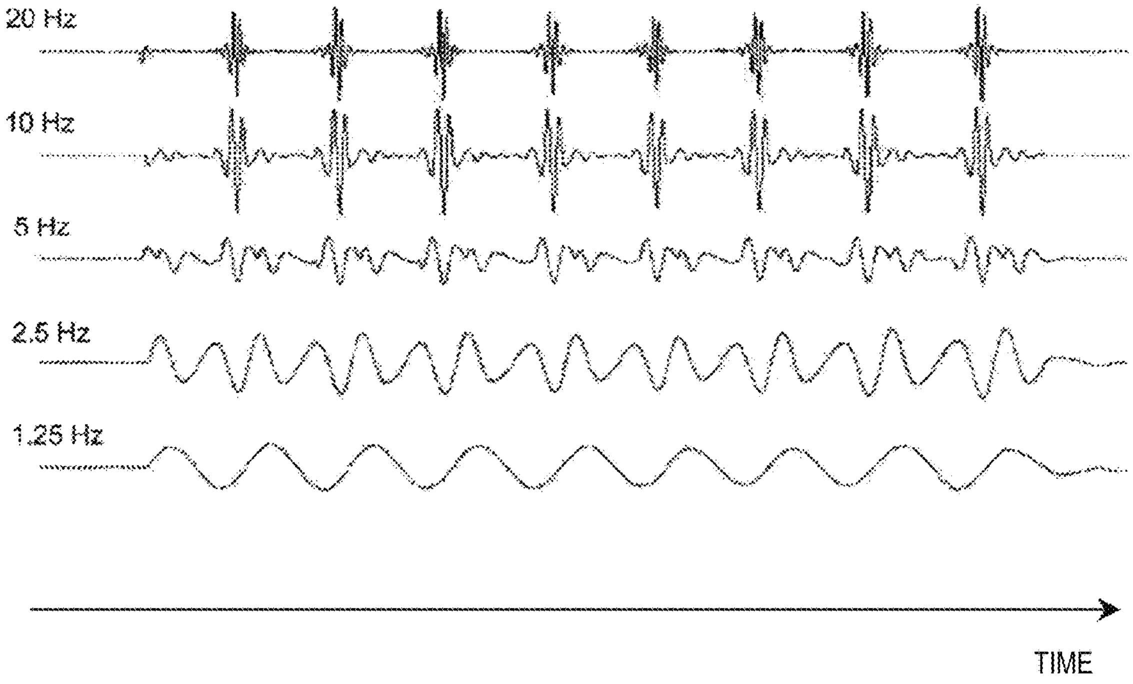
FIG. 8 is a graph exemplifying a plurality of frequency components obtained by performing a wavelet transform upon a scaled signal $S_z$ illustrated in FIG. 5.

FIG. 8 is a graph exemplifying a plurality of frequency components obtained by performing a wavelet transform upon the scaled signal $S_z$ illustrated in FIG. 5. Although m=5 in FIG. 8, the value of m is not limited thereto. Upon the scaled signals $S_x$ and $S_y$, wavelet transform can similarly be performed to decompose each of them into a plurality of frequency components.

Referring back to FIG. 3, after step S4, the arithmetic circuit 12 performs a phase analysis upon the multiple frequency components of the scaled signal obtained in step S4 (S5).

Figure 9:
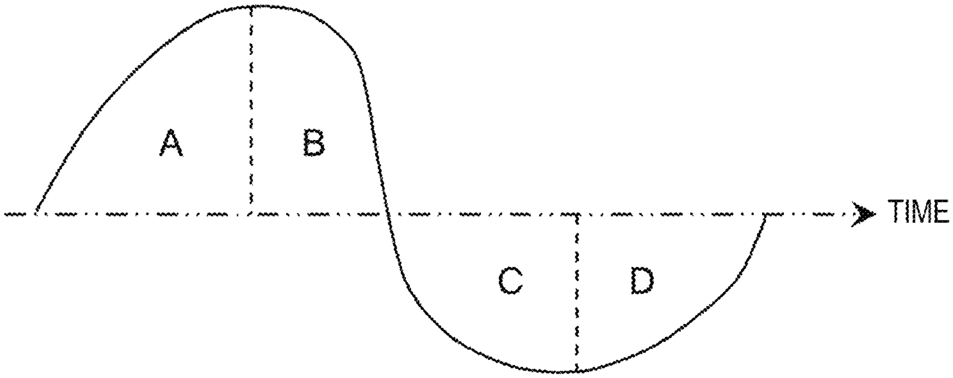
FIG. 9 is a schematic diagram illustrating an example of phase analysis processing.

FIG. 9 is a schematic diagram illustrating an example of phase analysis processing in step S5. For example, the arithmetic circuit 12 classifies a waveform representing the frequency component of the scaled signal into four phase sections A, B, C, and D as illustrated in FIG. 9. The phase section A is a phase section from a point at which the waveform crosses a zero crossing point in the positive direction of amplitude to the positive peak point (local maximum point or maximal point) of the waveform. The phase section B is a phase section from the endpoint of the phase section A to a point at which the waveform crosses the zero crossing point in the negative direction. The phase section C is a phase section from the endpoint of the phase section B to the negative peak point (local minimum point or minimal point) of the waveform. The phase section D is a phase section from the endpoint of the phase section C to a point at which the waveform crosses the zero crossing point in the positive direction of amplitude. When the waveform is a substantially sinusoidal curve illustrated in FIG. 9, the endpoint of the phase section D matches the start point of the phase section A of the scaled signal in the next period.

Information including the positions of these phase sections A to D, e.g., the start time and end time of each of the phase sections and labels (A to D) applied to the respective phase sections is an example of phase information in the present disclosure.

Referring back to FIG. 3, after step S5, the arithmetic circuit 12 creates a phase object using a result of the phase analysis (S6). The phase object is information obtained by, for example, aligning the pieces of phase information of a plurality of frequency components of a scaled signal in chronological order. An example of processing for causing the arithmetic circuit 12 to create a phase object from two frequency components $QP_{x,1}$ and $QP_{x,2}$ of an x-direction scaled signal and two frequency components $QP_{y,1}$ and $QP_{y,2}$ of a y-direction scaled signal will be described with reference to FIG. 10.

In step S6, the arithmetic circuit 12 selects at least two frequency components from among the total of 3m frequency components obtained by decomposing each of three scaled signals corresponding to three directions, i.e., x, y, and z directions, into m frequency components. This selection processing is performed such that the selected frequency components include the frequency components corresponding to at least two of the three directions, i.e., x, y, and z directions. In this selection processing, the arithmetic circuit 12 selects the above at least two frequency components by, for example, extracting components representing characteristics well from among the 3m frequency components.

Figure 10:
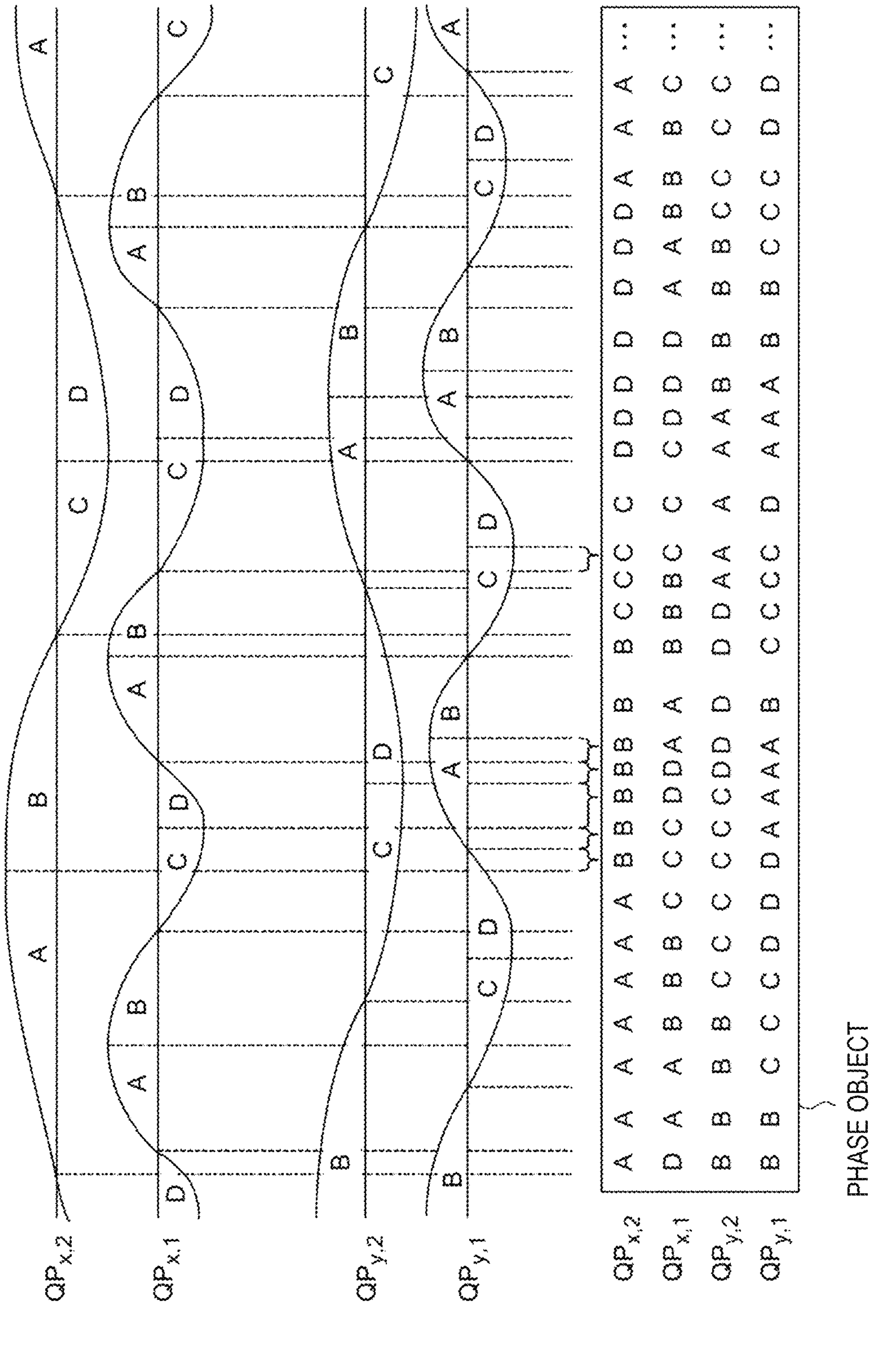
FIG. 10 is a diagram exemplifying phase objects.

In step S6, after the above selection processing, the arithmetic circuit 12 acquires the pieces of phase information of the at least two selected frequency components in chronological order and creates phase objects. FIG. 10 exemplifies phase objects obtained from the frequency components $QP_{x,1}$ and $QP_{x,2}$ in the x direction and the frequency components $QP_{y,1}$ and $QP_{y,2}$ in the y direction.

Referring to FIG. 10, the phase sections of the frequency components $QP_{x,1}$, $QP_{x,2}$, $QP_{y,1}$, and $QP_{y,2}$ between times when at least one of these frequency components changes are determined as phase objects. The arithmetic circuit 12 stores the phase sections of the frequency components $QP_{x,1}$, $QP_{x,2}$, $QP_{y,1}$, and $QP_{y,2}$ in the storage 13 each time at least one of these frequency components changes. The pieces of chronological phase information of the frequency components created as above become phase objects.

Figure 11:
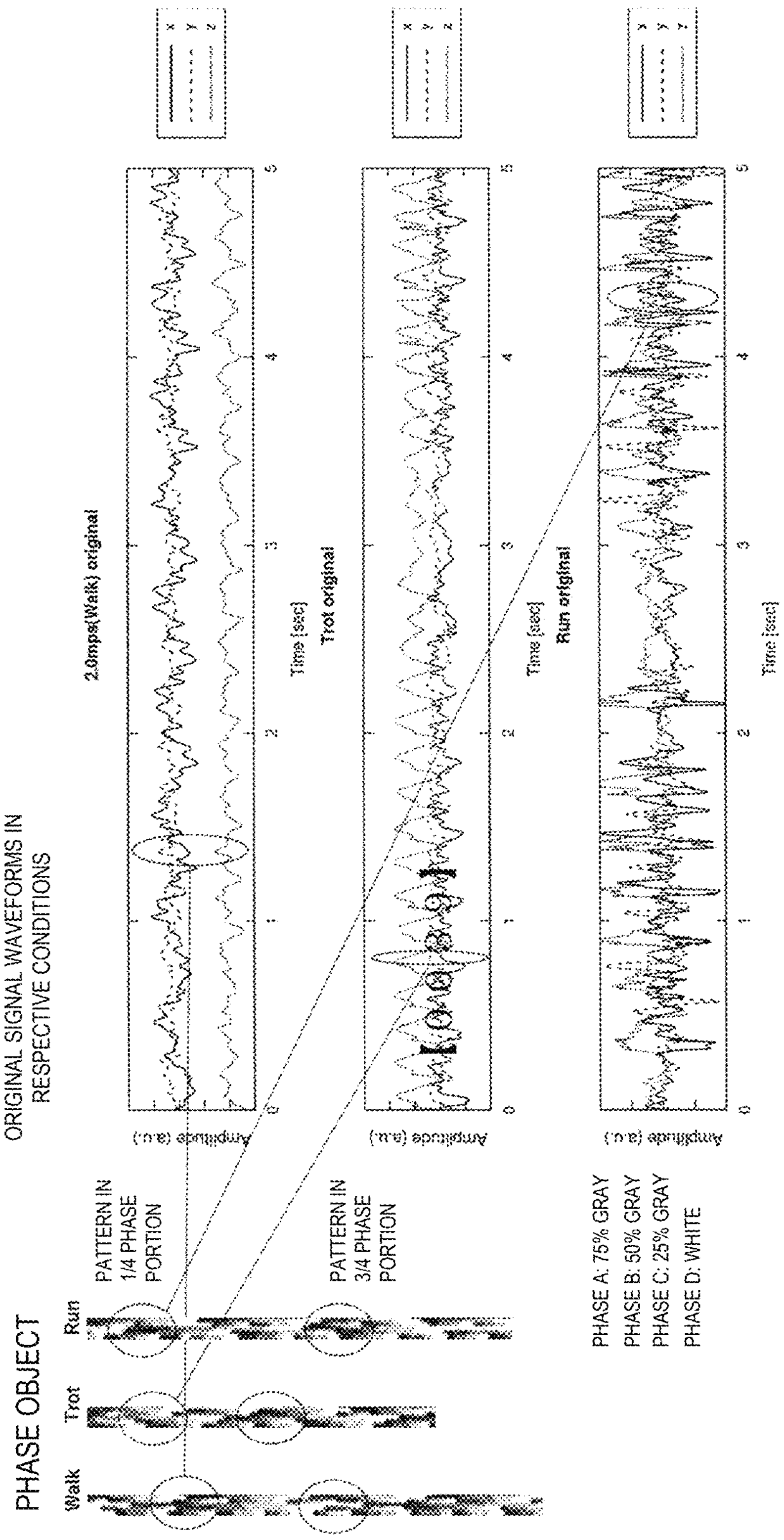
FIG. 11 is a schematic diagram exemplifying original signal waveforms corresponding to gaits of walk, trot, and run and phase objects obtained by analyzing the respective original signal waveforms in accordance with the present embodiment.

FIG. 11 is a schematic diagram exemplifying original signal waveforms corresponding to gaits of walk, trot, and run and phase objects obtained by analyzing the respective original signal waveforms in accordance with the present embodiment. The original signal waveform illustrated in FIG. 11 is a waveform representing the acceleration data acquired in step S1 in FIG. 3. In the phase objects in FIG. 11, the phase section A is illustrated in darkest gray (75% gray), the phase section B is illustrated in medium gray (50% gray), the phase section C is illustrated in medium gray (25% gray), and the phase section D is illustrated in white. Unlike the phase objects in FIG. 10 that are horizontally aligned in chronological order, the phase objects are vertically aligned in chronological order in FIG. 11. That is, the time axis of the phase objects in FIG. 11 extends in the vertical direction relative to the plane of the paper.

In the example in FIG. 11, when the period of the frequency component corresponding to the x-direction acceleration is defined as T, characteristics appear at the phase object corresponding to the waveform around T/4 or 3T/4 of the frequency component. Accordingly, the arithmetic circuit 12 can classify biological activity patterns on the basis of the characteristics of phase information corresponding to T/4 or 3T/4 of the frequency component or portions around T/4 or 3T/4.

The waveforms around T/4 of the frequency component include waveforms included within T/4±T/4 of the frequency component, e.g., waveforms included within T/4±T/8, T/4±T/10, and T/4±T/16. The waveforms around 3T/4 of the frequency component similarly include waveforms included within 3T/4±T/4 of the frequency component, e.g., waveforms included within 3T/4±T/8, 3T/4±T/10, and 3T/4±T/16.

Referring back to FIG. 3, after step S6, the arithmetic circuit 12 classifies gaits on the basis of the phase objects created in step S6 (S7). To classify biological activity patterns (e.g., gaits) means to determine which pattern determined in advance the biological activity pattern corresponds to. In the present embodiment, the arithmetic circuit 12 classifies whether the gait of a dog is walk, trot, run (gallop).

In step S7, for example, the arithmetic circuit 12 inputs the phase objects into the learned model stored in the storage 13 and causes the learned model to detect a gait classification result. The learned model is generated by, for example, a supervised learning method of causing a model to learn the relationship between a phase object and correct answer information which is performed by the arithmetic circuit 12 or another information processing device. An example of such models is a learning model having a neural network structure, e.g., a convolutional neural network (CNN) structure. The model may be a decision tree model for performing machine learning by the decision tree method including a classification tree or a learning model such as a support vector machine.

Figure 12A:
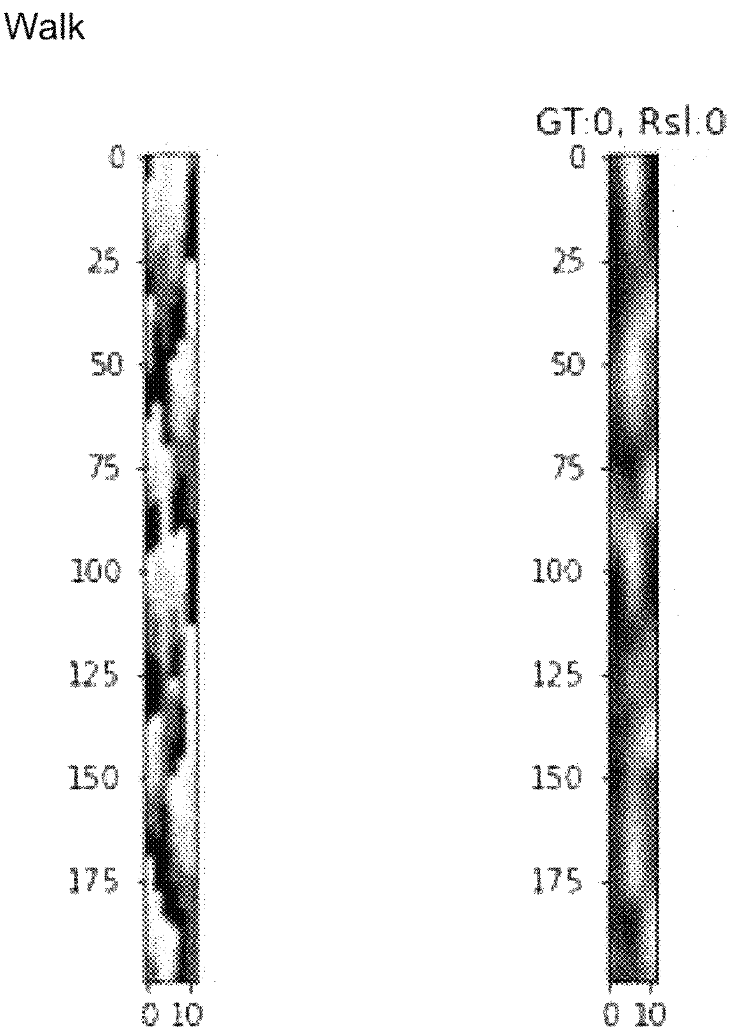
FIG. 12A is a schematic diagram illustrating a phase object corresponding to walk and a color map obtained by visualizing the characteristics of the phase object.
Figure 12B:
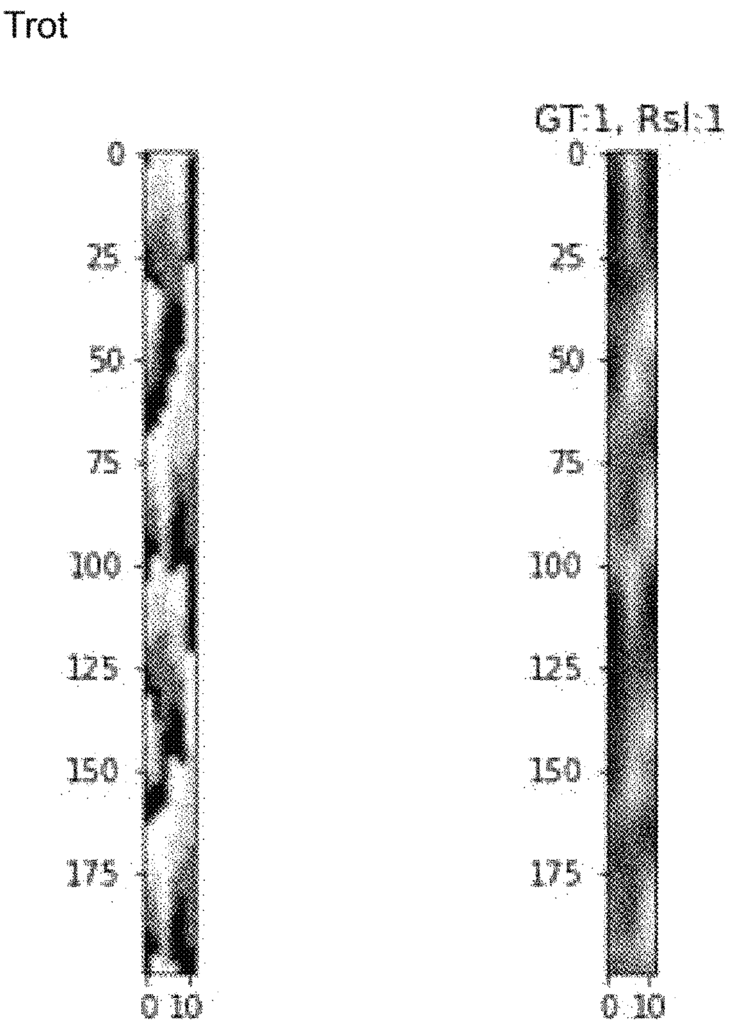
FIG. 12B is a schematic diagram illustrating a phase object corresponding to trot and a color map obtained by visualizing the characteristics of the phase object.
Figure 12C:
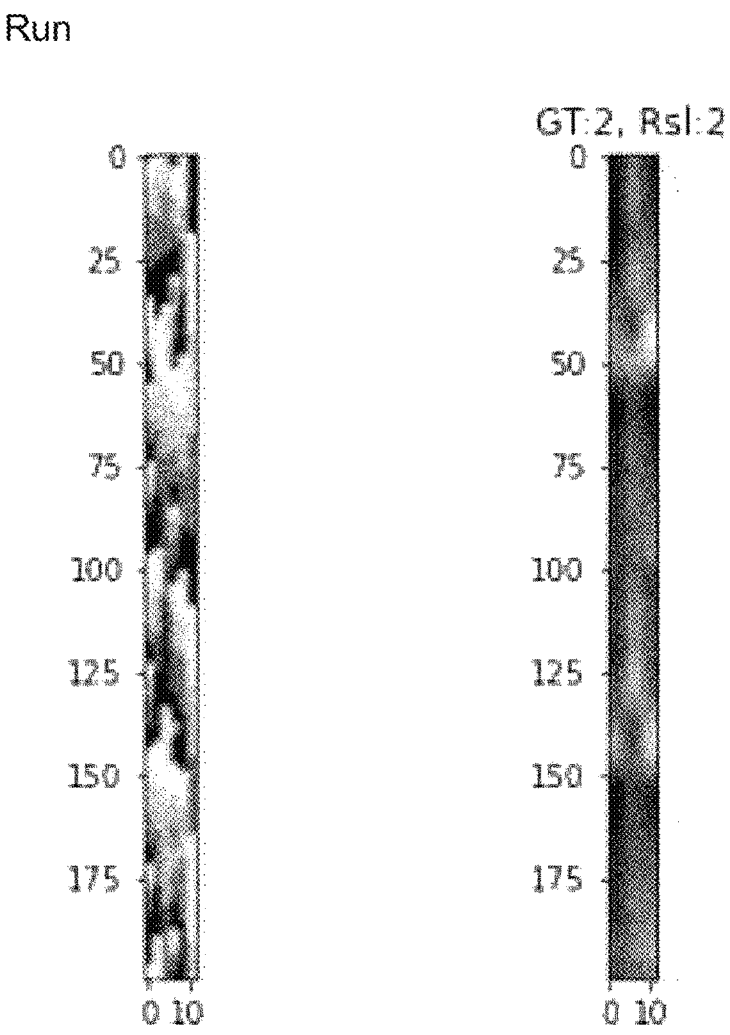
FIG. 12C is a schematic diagram illustrating a phase object corresponding to run and a color map obtained by visualizing the characteristics of the phase object.

FIGS. 12A, 12B, and 12C are schematic diagrams illustrating phase objects corresponding to walk, trot, and run (gallop), respectively and color maps obtained by visualizing the characteristics of the phase objects. In FIGS. 12A, 12B, and 12C, the left-side drawing illustrates the phase object and the right-side drawing illustrates the color map.

These color maps are obtained by, for example, applying Grad-CAM (gradient-weighted class activation mapping) to the phase objects. Grad-CAM is a technique for generating a color map by intervening in a convolutional layer of a CNN and highlighting a discriminative region in an input image. In the color maps illustrated in FIGS. 12A, 12B, and 12C, the discriminative parts of the phase objects input into Grad-CAM are illustrated with a bright (white) color. In the color maps, a part where characteristics are weak is illustrated in black. The stronger the characteristics, the whiter the part appears.

In step S7, the arithmetic circuit 12 can classify gaits on the basis of the discriminative parts of the phase objects illustrated in FIGS. 12A, 12B, and 12C.

Figure 13:
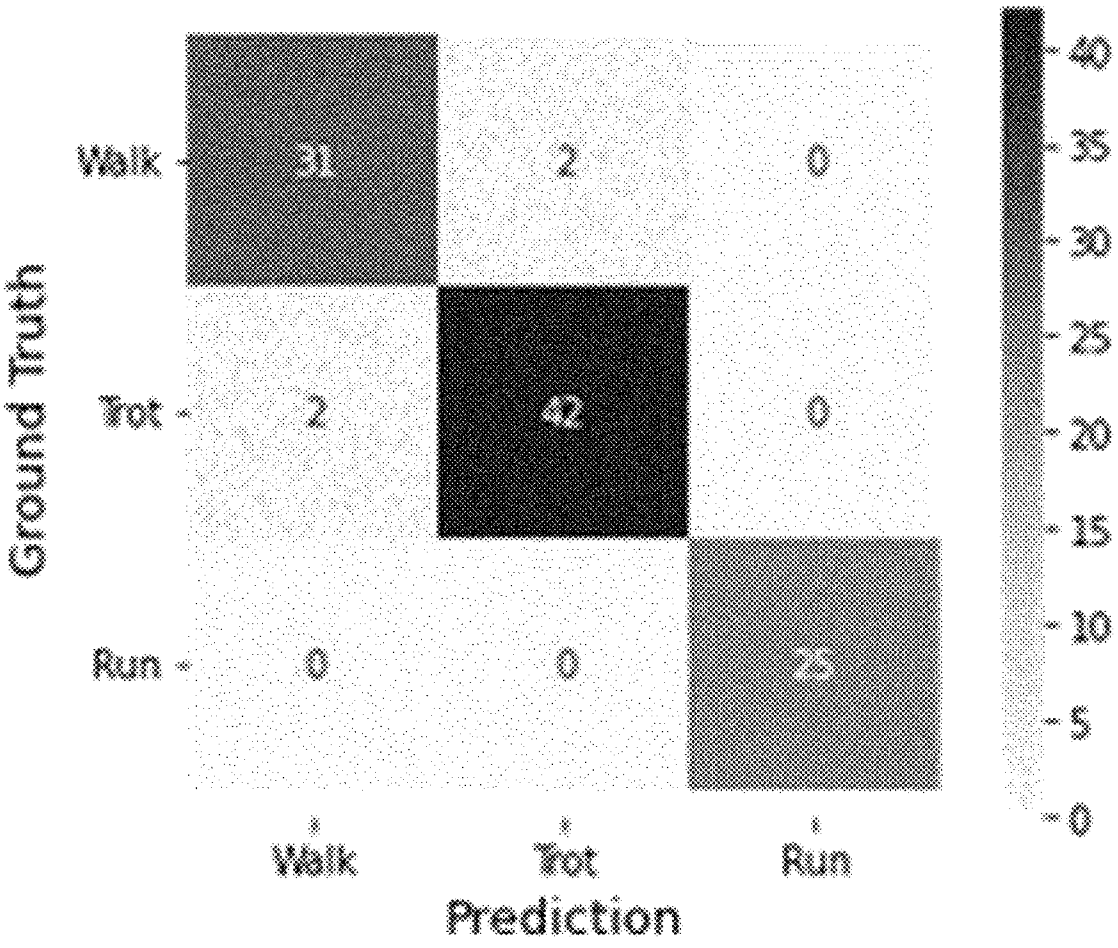
FIG. 13 is a confusion matrix representing the relationship between a plurality of correct answer categories of acceleration data and prediction results of gait classification performed by a gait classification device 100 according to the present embodiment.

FIG. 13 is a confusion matrix representing the relationship between a plurality of correct answer categories (Ground Truth) of acceleration data and prediction results (Prediction) of gait classification performed by the gait classification device 100 according to the present embodiment. The uppermost row of the confusion matrix in FIG. 13 indicates that, for example, when the gait classification device 100 performed gait classification upon the waveforms of pieces of acceleration data acquired by the acceleration sensor unit 2 attached to a dog that was performing walk, the number of cases predicted as "walk" was 31, the number of cases predicted as "trot" was 2, and the number of cases predicted as "run" was 0.

It is apparent from FIG. 13 that the majority of classification results of the gait classification device 100 are aligned on the diagonal of the confusion matrix and the accuracy of classification performed by the gait classification device 100 is high.

As described above, the gait classification device 100 according to the present embodiment classifies biological activity patterns of an animal. The gait classification device 100 includes the arithmetic circuit 12 configured to receive a biological signal that is a detection result of a biological activity of the animal acquired by a sensor having a plurality of detection channels or a sensor unit including a plurality of sensors. The arithmetic circuit 12 detects a quasi-periodic signal from the detection result (S2), scales the quasi-periodic signal in a time direction and generates a scaled signal whose period has a predetermined value (S3), decomposes the scaled signal into a plurality of frequency components by performing a wavelet transform upon the scaled signal (S4), acquires pieces of chronological phase information of the multiple frequency components (S5), and classifies the biological activity patterns based on the pieces of chronological phase information (S6). With this configuration, the biological activity patterns can be classified. The gait classification device 100 can further reduce the processing load of the arithmetic circuit 12.

As exemplified in the present embodiment, the biological activity may be animal movement. The detection result of a biological activity may be an acceleration measured by the acceleration sensor unit 2 attached to the animal. The biological activity patterns may be gaits of the animal. With this configuration, the gaits of the animal to which the acceleration sensor unit 2 is attached can be classified.

As exemplified in the present embodiment, the above-described animal may be a quadruped animal. The arithmetic circuit 12 may classify the biological activity patterns by determining which gait pattern of a quadruped animal determined in advance the respective biological activity patterns correspond to based on the pieces of chronological phase information. With this configuration, the gaits of the quadruped animal can be classified. The quadruped animal may be, for example, a dog.

As exemplified in the present embodiment, the acceleration sensor unit 2 may be capable of measuring a plurality of (n) first acceleration components of the acceleration one-to-one corresponding to a plurality of directions that are different from each other. In processing for detecting the quasi-periodic signal, the arithmetic circuit 12 detects a plurality of first quasi-periodic signals from the respective multiple first acceleration components measured by the acceleration sensor unit 2. In processing for generating the scaled signal, the arithmetic circuit 12 generates a plurality of first scaled signals by scaling the multiple first quasi-periodic signals in a time direction and generating scaled signals whose respective periods have a predetermined value. In processing for decomposing the scaled signal into a plurality of frequency components, the arithmetic circuit 12 decomposes each of the multiple first scaled signals into a plurality of (m) second frequency components. In processing for acquiring pieces of chronological phase information of the multiple frequency components, the arithmetic circuit 12 acquires pieces of chronological phase information of at least one of the multiple second frequency components corresponding to the respective multiple first scaled signals. In processing for classifying the biological activity patterns, the arithmetic circuit 12 classifies the biological activity patterns using a phase object in which the pieces of phase information are aligned in chronological order.

By performing classification using analysis results of the multiple acceleration components, the biological activity patterns can be more accurately classified. For example, the gaits of the animal can be accurately predicted by performing classification using detection results of forward/backward, left/right, and up/down movements of the animal.

In processing for classifying the biological activity patterns, when a period of one of the multiple frequency components is defined as T, the arithmetic circuit 12 may classify the biological activity patterns based on characteristics of phase information corresponding to T/4 or 3T/4 of the frequency component, of the pieces of chronological phase information. With this configuration in which an analysis point is limited to the above-described portion, classification can be performed with high accuracy while suppressing a calculation cost, resources, or the processing load of the arithmetic circuit 12.

Modification

While the embodiment of the present disclosure has been described in detail above, the foregoing description is merely illustrative of the present disclosure in all respects. Various improvements and modifications can be made without necessarily departing from the scope of the present disclosure. For example, the following changes are possible. In the following description, the same reference numerals are used for the same components as those in the above-described embodiment, and description of the same points as those in the above-described embodiment is omitted as appropriate. The following modifications can be combined as appropriate.

Although an example of an "animal" according to the present disclosure has been described as a quadruped animal in the above embodiment, the present disclosure is not limited thereto. For example, examples of an "animal" according to the present disclosure include a biped animal. For example, examples of an "animal" according to the present disclosure include a "human being". Accordingly, an information processing device according to the present disclosure can classify the gaits of a human being as the gaits of an animal.

In the above embodiment, the exemplary case has been described where the gaits of an animal are classified on the basis of results obtained by scaling and decomposing acceleration data detected by the acceleration sensor unit 2 attached to the animal. However, an information processing device according to the present disclosure is not limited thereto. For example, an information processing device may classify or predict conditions related to heartbeat on the basis of results obtained by scaling and decomposing pulse wave data of an animal.

Figure 14:
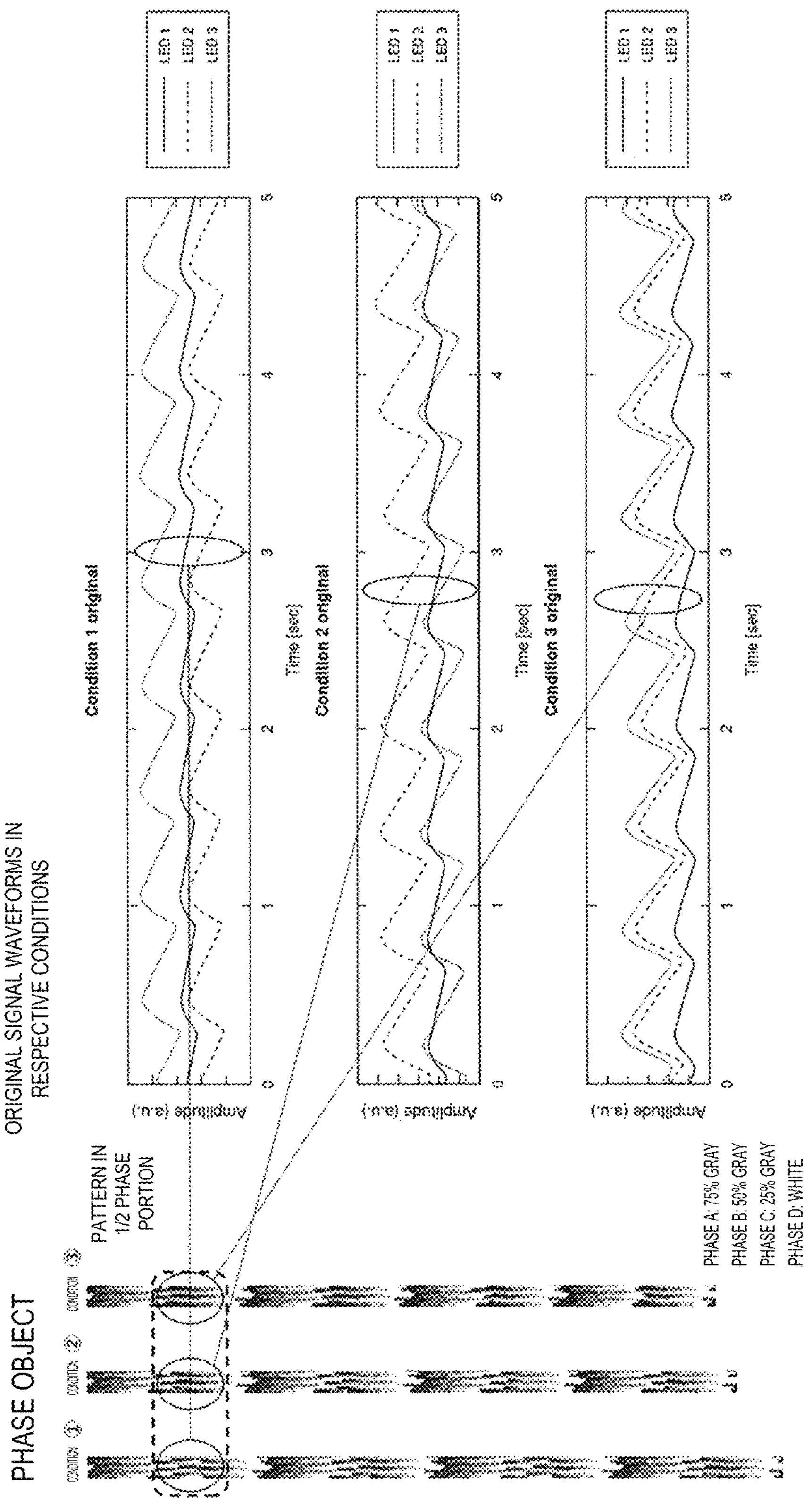
FIG. 14 is a schematic diagram exemplifying original signal waveforms of pieces of pulse wave data measured under three different conditions and phase objects obtained by analyzing the respective original signal waveforms.

FIG. 14 is a schematic diagram exemplifying original signal waveforms of pieces of pulse wave data measured under three different conditions and phase objects obtained by analyzing the respective original signal waveforms. The pulse wave data is measured by, for example, a photoelectric volume pulse wave meter. A photoelectric volume pulse wave meter is a device for detecting information about pulse waves associated with heartbeats by measuring the change in blood volume in blood vessels corresponding to the change in heart rate. The photoelectric volume pulse wave meter includes, for example, a light source and a photodetector. The light source emits a plurality of channels of light with different wavelengths from each other. The light source emits at least infrared light. Infrared light emitted by the light source is transferred through animal's tissues, is absorbed by blood hemoglobin, is reflected from tissues, and then reaches the photodetector. Since the amount of light that reaches the photodetector is proportional to a tissue blood volume, the photoelectric volume pulse wave meter can detect information about pulse waves. The above photoelectric volume pulse wave meter including the light source and the photodetector is an example of a "sensor unit" according to the present disclosure.

The right-side graph in FIG. 14 represents original signal waveforms of pieces of pulse wave data measured by three LEDs that emit infrared light under different conditions from each other. An original signal waveform that is a quasi-periodic signal is subjected to the scaling (S3 in FIG. 3), the wavelet transform (S4), and the phase analysis (S5) in arithmetic circuit 12, and phase objects are created (S6). In the phase objects in FIG. 14, the phase section A is illustrated in darkest gray (75% gray), the phase section B is illustrated in medium gray (50% gray), the phase section C is illustrated in medium gray (25% gray), and the phase section D is illustrated in white.

In the present modification, when the period of the frequency component is defined as T, characteristics appear at the phase object corresponding to the waveform around T/2 of the frequency component. The arithmetic circuit 12 can classify or predict conditions related to heartbeat on the basis of the phase objects. In another modification, the arithmetic circuit 12 may classify or predict states of blood flow obtained with various measurement methods.

ASPECTS OF THE PRESENT DISCLOSURE

Aspects of the present disclosure will be appended below.

Aspect 1

An information processing device for classifying biological activity patterns of an animal, comprising an arithmetic circuit configured to receive a biological signal that is a detection result of a biological activity of the animal acquired by a sensor having a plurality of detection channels or a sensor unit including a plurality of sensors, wherein the arithmetic circuit detects a quasi-periodic signal from the detection result, scales the quasi-periodic signal in a time direction and generates a scaled signal whose period has a predetermined value, decomposes the scaled signal into a plurality of frequency components, acquires pieces of chronological phase information of the plurality of frequency components, and classifies the biological activity patterns based on the pieces of chronological phase information.

Aspect 2

The information processing device according to Aspect 1, wherein the arithmetic circuit decomposes the scaled signal into a plurality of frequency components by performing a wavelet transform upon the scaled signal.

Aspect 3

The information processing device according to Aspect 1 or 2, wherein the biological activity is animal movement, wherein the sensor unit is an acceleration sensor unit attached to the animal, wherein the detection result of a biological activity is an acceleration measured by the acceleration sensor unit, and wherein the biological activity patterns are gaits of the animal.

Aspect 4

The information processing device according to Aspect 3,
wherein the animal is a quadruped animal, and
wherein the arithmetic circuit classifies the biological activity patterns by determining which gait pattern of a quadruped animal determined in advance the respective biological activity patterns correspond to based on the pieces of chronological phase information.

Aspect 5

The information processing device according to Aspect 4, wherein the animal is a dog.

Aspect 6

The information processing device according to any one of Aspects 1 to 5,
wherein the sensor unit is an acceleration sensor unit attached to the animal,
wherein the detection result of a biological activity is an acceleration measured by the acceleration sensor unit,
wherein the acceleration sensor unit can measure a plurality of first acceleration components of the acceleration one-to-one corresponding to a plurality of directions that are different from each other, and
wherein the arithmetic circuit,
in processing for detecting the quasi-periodic signal, detects a plurality of first quasi-periodic signals from the respective plurality of first acceleration components measured by the acceleration sensor unit,
in processing for generating the scaled signal, generates a plurality of first scaled signals by scaling the plurality of first quasi-periodic signals in a time direction and generating scaled signals whose respective periods have a predetermined value,
in processing for decomposing the scaled signal into a plurality of frequency components, decomposes each of the plurality of first scaled signals into a plurality of second frequency components,
in processing for acquiring pieces of chronological phase information of the plurality of frequency components, acquires pieces of chronological phase information of at least one of the plurality of second frequency components corresponding to the respective plurality of first scaled signals, and
in processing for classifying the biological activity patterns, classifies the biological activity patterns using a phase object in which the pieces of phase information are aligned in chronological order.

Aspect 7

The information processing device according to any one of Aspects 1 to 6, wherein, in processing for classifying the biological activity patterns, when a period of one of the plurality of frequency components is defined as T, the arithmetic circuit classifies the biological activity patterns based on characteristics of phase information corresponding to T/4 or 3T/4 of a frequency component, of the pieces of chronological phase information.

Aspect 8

An information processing method of classifying biological activity patterns of an animal, comprising:
a step of causing an arithmetic circuit configured to receive a biological signal that is a detection result of a biological activity of the animal acquired by a sensor having a plurality of detection channels or a sensor unit including a plurality of sensors to detect a quasi-periodic signal from a detection result of a biological activity;
a step of causing the arithmetic circuit to generate a scaled signal by scaling the quasi-periodic signal such that a period of the quasi-periodic signal has a predetermined value after being scaled;
a step of causing the arithmetic circuit to decompose the scaled signal into a plurality of frequency components;
a step of causing the arithmetic circuit to acquire pieces of chronological phase information of the plurality of frequency components; and
a step of causing the arithmetic circuit to classify the biological activity patterns based on the pieces of chronological phase information.

Aspect 9

A program for causing an arithmetic circuit to execute the information processing method according to Aspect 8.

REFERENCE SIGNS LIST

2 acceleration sensor unit
11 input/output unit
12 arithmetic circuit
13 storage
14 communication unit
100 gait classification device

The invention claimed is:

1. An information processing device for classifying biological activity patterns of an animal, comprising:
an arithmetic circuit configured to receive a biological signal that is a detection result of a biological activity of the animal acquired by at least one sensor having a plurality of detection channels, wherein the arithmetic circuit is configured to:
detect a quasi-periodic signal from the detection result,
scale the quasi-periodic signal in a time direction and generate a scaled signal whose period has a predetermined value,
decompose the scaled signal into a plurality of frequency components,
acquire pieces of chronological phase information of the plurality of frequency components, and
classify the biological activity patterns based on the pieces of chronological phase information.

2. The information processing device according to claim 1, wherein the arithmetic circuit is configured to decompose the scaled signal into a plurality of frequency components by performing a wavelet transform upon the scaled signal.

3. The information processing device according to claim 1,
wherein the biological activity is animal movement,
wherein the sensor is an acceleration sensor configured to attach to the animal,
wherein the detection result is an acceleration measured by the acceleration sensor, and
wherein the biological activity patterns are gaits of the animal.

4. The information processing device according to claim 3,
wherein the animal is a quadruped animal, and wherein the arithmetic circuit is configured to classify the biological activity patterns by determining a corresponding gait pattern of a predetermined quadruped animal based on the pieces of chronological phase information.

5. The information processing device according to claim 4, wherein the animal is a dog.

6. The information processing device according to claim 1, wherein the sensor is an acceleration sensor configured to attach to the animal, wherein the detection result is an acceleration measured by the acceleration sensor, wherein the acceleration sensor is configured to measure a plurality of first acceleration components of the acceleration corresponding one-to-one to a plurality of directions that are different from each other, and wherein the arithmetic circuit is configured to:

detect a plurality of first quasi-periodic signals from the respective plurality of first acceleration components, generate a plurality of first scaled signals by scaling the plurality of first quasi-periodic signals in a time direction and generate scaled signals whose respective periods have a predetermined value, decompose each of the plurality of first scaled signals into a plurality of second frequency components, acquire pieces of chronological phase information of at least one of the plurality of second frequency components corresponding to the respective plurality of first scaled signals, and classify the biological activity patterns based on a phase object in which the pieces of phase information are aligned in chronological order.

7. The information processing device according to claim 1, wherein, the arithmetic circuit is configured to classify the biological activity patterns based on characteristics of the pieces chronological phase information corresponding to T/4 or 3T/4 of a frequency component, where T is a period of one of the plurality of frequency components.

8. An information processing method of classifying biological activity patterns of an animal, comprising:

receiving a biological signal that is a detection result of a biological activity of the animal comprising a quasi-periodic signal acquired by at least one sensor having a plurality of detection channels;

generating a scaled signal by scaling the quasi-periodic signal such that a period of the quasi-periodic signal has a predetermined value after being scaled;

decomposing the scaled signal into a plurality of frequency components;

acquiring pieces of chronological phase information of the plurality of frequency components; and classifying the biological activity patterns based on the pieces of chronological phase information.

9. A non-transitory computer-readable medium having instructions stored thereon, that, when executed by an arithmetic circuit, cause the arithmetic circuit to perform the information processing method according to claim 8.

10. The information processing device according to claim 2, wherein the biological activity is animal movement, wherein the sensor is an acceleration sensor configured to attach to the animal, wherein the detection result is an acceleration measured by the acceleration sensor, and wherein the biological activity patterns are gaits of the animal.

11. The information processing device according to claim 2, wherein the sensor is an acceleration sensor configured to attach to the animal, wherein the detection result is an acceleration measured by the acceleration sensor, wherein the acceleration sensor is configured to measure a plurality of first acceleration components of the acceleration corresponding one-to-one to a plurality of directions that are different from each other, and wherein the arithmetic circuit is configured to:

detect a plurality of first quasi-periodic signals from the respective plurality of first acceleration components, generate a plurality of first scaled signals by scaling the plurality of first quasi-periodic signals in a time direction and generate scaled signals whose respective periods have a predetermined value, decompose each of the plurality of first scaled signals into a plurality of second frequency components, acquire pieces of chronological phase information of at least one of the plurality of second frequency components corresponding to the respective plurality of first scaled signals, and classify the biological activity patterns based on a phase object in which the pieces of phase information are aligned in chronological order.

12. The information processing device according to claim 3, wherein the sensor is an acceleration sensor configured to attach to the animal, wherein the detection result is an acceleration measured by the acceleration sensor, wherein the acceleration sensor is configured to measure a plurality of first acceleration components of the acceleration corresponding one-to-one to a plurality of directions that are different from each other, and wherein the arithmetic circuit is configured to:

detect a plurality of first quasi-periodic signals from the respective plurality of first acceleration components, generate a plurality of first scaled signals by scaling the plurality of first quasi-periodic signals in a time direction and generate scaled signals whose respective periods have a predetermined value, decompose each of the plurality of first scaled signals into a plurality of second frequency components, acquire pieces of chronological phase information of at least one of the plurality of second frequency components corresponding to the respective plurality of first scaled signals, and classify the biological activity patterns based on a phase object in which the pieces of phase information are aligned in chronological order.

13. The information processing device according to claim 4, wherein the sensor is an acceleration sensor configured to attach to the animal, wherein the detection result is an acceleration measured by the acceleration sensor, wherein the acceleration sensor is configured to measure a plurality of first acceleration components of the acceleration corresponding one-to-one to a plurality of directions that are different from each other, and wherein the arithmetic circuit is configured to:

detect a plurality of first quasi-periodic signals from the respective plurality of first acceleration components, generate a plurality of first scaled signals by scaling the plurality of first quasi-periodic signals in a time direction and generate scaled signals whose respective periods have a predetermined value, decompose each of the plurality of first scaled signals into a plurality of second frequency components, acquire pieces of chronological phase information of at least one of the plurality of second frequency components corresponding to the respective plurality of first scaled signals, and classify the biological activity patterns based on a phase object in which the pieces of phase information are aligned in chronological order.

14. The information processing device according to claim 5, wherein the sensor is an acceleration sensor configured to attach to the animal, wherein the detection result is an acceleration measured by the acceleration sensor, wherein the acceleration sensor is configured to measure a plurality of first acceleration components of the acceleration corresponding one-to-one to a plurality of directions that are different from each other, and wherein the arithmetic circuit is configured to:

detect a plurality of first quasi-periodic signals from the respective plurality of first acceleration components, generate a plurality of first scaled signals by scaling the plurality of first quasi-periodic signals in a time direction and generate scaled signals whose respective periods have a predetermined value, decompose each of the plurality of first scaled signals into a plurality of second frequency components, acquire pieces of chronological phase information of at least one of the plurality of second frequency components corresponding to the respective plurality of first scaled signals, and classify the biological activity patterns based on a phase object in which the pieces of phase information are aligned in chronological order.

15. The information processing device according to claim 2, wherein, the arithmetic circuit is configured to classify the biological activity patterns based on characteristics of the pieces chronological phase information corresponding to T/4 or 3T/4 of a frequency component, where T is a period of one of the plurality of frequency components.

16. The information processing device according to claim 3, wherein, the arithmetic circuit is configured to classify the biological activity patterns based on characteristics of the pieces chronological phase information corresponding to T/4 or 3T/4 of a frequency component, where T is a period of one of the plurality of frequency components.

17. The information processing device according to claim 4, wherein, the arithmetic circuit is configured to classify the biological activity patterns based on characteristics of the pieces chronological phase information corresponding to T/4 or 3T/4 of a frequency component, where T is a period of one of the plurality of frequency components.

18. The information processing device according to claim 5, wherein, the arithmetic circuit is configured to classify the biological activity patterns based on characteristics of the pieces chronological phase information corresponding to T/4 or 3T/4 of a frequency component, where T is a period of one of the plurality of frequency components.

19. The information processing device according to claim 6, wherein, the arithmetic circuit is configured to classify the biological activity patterns based on characteristics of the pieces chronological phase information corresponding to T/4 or 3T/4 of a frequency component, where T is a period of one of the plurality of frequency components.

* * * * *